United States Patent [19]
Thomas

[11] Patent Number: 6,014,558
[45] Date of Patent: Jan. 11, 2000

[54] VARIABLE RATE OPTIONAL SECURITY MEASURES METHOD AND APPARATUS FOR WIRELESS COMMUNICATIONS NETWORK

[75] Inventor: Michael Thomas, Plano, Tex.

[73] Assignee: Northern Telecom Limited, Montreal, Canada

[21] Appl. No.: 09/221,909

[22] Filed: Dec. 28, 1998

[51] Int. Cl.[7] .................................................. H04M 11/00
[52] U.S. Cl. ........................................... 455/410; 455/411
[58] Field of Search ..................................... 455/410, 411, 455/453, 67.1, 405, 67.7; 340/825.31, 825.34, 825.49; 380/23; 370/252, 253

[56] References Cited

U.S. PATENT DOCUMENTS 5,734,977 3/1998 Sanmugam .............................. 455/410

Primary Examiner—Wellington Chin
Assistant Examiner—Rafael Perez-Gutierrez
Attorney, Agent, or Firm—Haynes and Boone, L.L.P.

[57] ABSTRACT

A method for implementing variable rate optional security measures in a wireless communications network, the communications network having a plurality of nodes for communication with mobile subscribers, includes the following steps. A capacity constraint of at least one node of the network is first determined. A load list is dynamically maintained for each node as a function of the capacity constraint, the load list indicating any overload states of the nodes. Lastly, at least one optional security measure is performed on the network as a function of the load list, wherein the at least one optional security measure is selected from a plurality of optional security procedures. An apparatus for implementing variable rate optional security measures in a wireless communications network is also disclosed.

23 Claims, 4 Drawing Sheets

VARIABLE RATE OPTIONAL SECURITY MEASURES METHOD AND APPARATUS FOR WIRELESS COMMUNICATIONS NETWORK

BACKGROUND OF THE INVENTION

1. Field of the Invention

The present invention relates generally to communications systems, and more particularly, to security measures for wireless communications systems.

2. Discussion of the Related Art

Various security measures are known which have been implemented for ensuring an authorized usage of mobile stations and communications equipment in a telecommunications system. The various security measures further are implemented for detecting and eliminating fraudulent users from a given telecommunications network. There are minimum security measures mandated by Global System for Mobile communications (GSM). Any security measures beyond the mandatory GSM recommendations are referred to as optional security measures.

With respect to security measures, GSM supports various procedures for enhancing the security of a telecommunications network. These various procedures include authentication, ciphering, TMSI reallocation, and EIR/IMEI (Equipment Identifier Register/International Mobile Equipment Identifier) Query/check, as briefly discussed further herein below.

Authentication is a process of verifying the identity of a subscriber through a random challenge, for example, on the order of every one in twenty subscribers. Subscribers may be authenticated at given intervals or occurrences from the mandatory minimums to as often as every transaction. Mandatory minimums may include, for example, authentication of a mobile station at power-up or when moving from a current cell into a new cell.

With reference to FIG. 1, authentication will now be further discussed. In a first step, an MSC/VLR (12/14) of wireless communication system 10 requests the HLR 16 to supply authentication vectors for a subscriber mobile station MS 18 (also referred to as mobile equipment ME). The wireless communication system includes a home system and a serving system. In a second step, the HLR 16 returns authentication vectors received from authentication center AC 20 to the MSC/VLR (12/14). The VLR 14 then stores authentication vectors Sign Response, Ciphering Key, and Random Number (SRES, Kc, RAND) until needed. In a third step, when the MSC/VLR (12/14) decides to authenticate, the subscriber Kc and RAND are sent to the BSC 22. RAND is sent to the ME 18. In a fourth step, the ME 18 uses RAND and an A3 algorithm on a subscriber identity module SIM 24 (FIG. 3) of the mobile equipment ME 18 to compute SRES'. SRES' is then passed up from the ME 18 onto the MSC/VLR (12/14). In a fifth step, the VLR 14 checks to see if SRES=SRES'. If so, then the mobile equipment's identity has been authenticated.

With reference now to FIG. 2, an EIR database 30 shall be briefly discussed. The EIR is a GSM database having a record of IMEIs of GSM mobiles which are approved or for which problems have been detected (e.g., stolen mobiles). The EIR database 18 can be accessed by the MSC/VLRs to check the status of a particular IMEI.

The organization of subscriber data in the EIR database may include, for example, a white list, a black list, and a grey list. The white list contains a range of IMEIs allocated to approved mobile equipments (MEs). The black list includes the list of IMEIs for MEs which need to be barred either because that have been stolen or because of severe malfunctions. The grey list is an intermediate list between the white and black lists. The grey list includes IMEIs of faulty MEs whose fault is not important enough to justify total barring. Operators, such as PLMN operators, update the EIR database. The EIR database receives and outputs to/from the MSC/VLR via a suitable protocol, such as a MAP/F (Mobile Application Protocol) protocol.

Ciphering is another security measure and involves a process to scramble the bearer and signaling connection to a particular user. Ciphering keys are updated every time a subscriber is authenticated. When the subscriber is not authenticated, then the ciphering key is "tumbled" by a 3-bit (Ciphering Key) sequence number (CKSN).

With reference now to FIG. 3, authentication's role in ciphering for Mobile Equipment (ME) 18 shall be further discussed. As mentioned, if the ME or MS (mobile station) 18 is not authenticated, then the ME "tumbles" ciphering by using the CKSN. The CKSN is sent to a visitor location register (VLR) 14 upon transaction initiation and is checked to see if the CKSN matches the VLR entry—if so, then the transaction is allowed to proceed, otherwise the transaction is authenticated. The mobile equipment ME 18 is further characterized by inputs, outputs, and other components. Included is a radio interface frame number, RAND, SRES', Subscriber Identity Module (SIM) 24, A3, A8, Ki, A5 algorithm, and encryption, as are well known in the art. With the ME, the security measures include regenerate Kc, and maintain CKSN for future transactions (if not authenticated).

In the art, some mobile equipment is known to be GSM non-compliant. Such GSM non-compliant mobile equipment does not properly store the CKSN and therefore must be authenticated one in one (1 in 1). One perception of authenticating 1 in 1 may be that authentication 1 in 1 increases the likelihood of catching fraudulent subscribers, however, it also increases the exchange of ciphering keys. With the GSM non-compliant mobile equipment, it is further sometimes possible for the CKSNs to be corrupt, wherein improper ciphering (including garbled speech/failed transactions) results.

TMSI is another security measure and represents a Temporary Mobile Subscriber Identifier. TMSI hides the true user identity (IMSI) for clear channel communications, for example, page, mobile origination, and location update. TMSI's can be reallocated or changed from the mandatory minimums (i.e., the first time a subscriber accesses the mobile network system) to as often as every transaction. Furthermore, TMSI relates to a temporary number assigned to a mobile station (MS) for use by the mobile station as the mobile station registers on different telecommunication systems and cell sites. TMSI is used by the mobile station and a respective telecommunications system as a mobile identifier for all air interface communications within a given TMSI zone once the TMSI is assigned. The purpose of the TMSI is to reduce fraud by minimizing the transmission of a mobile station's MIN on the air interface. MIN represents an abbreviation for Mobile Identification Number, which is a ten digit mobile number in the U.S., or a three digit country code with a seven digit mobile number, otherwise. The reassignment of a new TMSI to a given MS occurs when the particular mobile station changes TMSI zones. The TMSI zones are an arbitrary set of base stations defined by a telecommunications operating company.

Additional security measures further include EIR Query and IMEI Check for further providing enhanced network security. With respect to EIR Query and IMEI Check, GSM PLMNs maintain a database of stolen and defective mobiles in an EIR database. A mobile station (MS) has its own identity, referred to as an international mobile equipment identifier (IMEI) which can be checked against the EIR database. EIR query/IMEI check are optional procedures.

The cost of security on a mobile communications network however can adversely impact an operation of the communications network. That is, security measures beyond the mandatory GSM recommendations have a particular cost capacity as outlined in the following. There is an approximate five and a half percent (5.5%) processor capacity loss incurred in going from a situation of no optional authentication to a situation of full authentication for a particular networked model. An approximate additional twelve and three tenths of a percent (12.3%) capacity loss occurs with a change from full authentication to EIR Query/IMEI check for every revenue-generating transaction (SMS/Calls). Lastly, there is an approximate additional two and eight tenths of a percent (2.8%) loss from full authentication and full EIR Query/IMEI check to reallocate TMSI on every transaction. Overall, there is an approximate twenty percent (20%) capacity penalty on a networked model and an approximate twenty-five percent (25%) capacity penalty on a stand alone model. These losses represent cumulative losses.

Furthermore, in known systems, the security measures have included the use of a given authentication procedure, for example, at a rate of one (1) in N calls, having been implemented as a capacity compromise. Still further, with current security measures implemented in coverage areas of high density, for example at airports, the telecommunication systems are virtually forced to disable all but the mandatory authentication and TMSI reallocation (and do not apply EIR Query) in order to maintain a competitive capacity but at the cost of weakened security for the service providers and subscribers.

It would thus be desirable to provide for improved security measures for wireless communication systems.

SUMMARY OF THE INVENTION

According to one embodiment of the present disclosure, a method for implementing variable rate optional security measures in a communications network, the communications network having a plurality of nodes for communication with mobile subscribers, includes the steps of determining a capacity constraint of at least one node of the network; dynamically maintaining a load list for each node as a function of the capacity constraint, the load list indicating any overload states of the nodes; and selectively performing at least one optional security measure on the network as a function of the load list, wherein the at least one optional security measure is selected from a plurality of optional security procedures.

According to another embodiment, a mobile communications switching apparatus for interaction with a plurality of nodes in a communication network and having variable rate optional security measures includes means for determining a capacity constraint of at least one node of the network; means for dynamically maintaining a load list for each node as a function of the capacity constraint, the load list indicating any overload states of the nodes; and means for selectively performing at least one optional security measure on the network as a function of the load list, wherein the at least one optional security measure is selected from a plurality of optional security procedures.

The present embodiments advantageously enable multiple rates of optional authentication, TMSI reallocation, and EIR query to be carried out in a telecommunications system as a function of time of day and a capacity determination. The present embodiments allow for increased opportunities to detect fraudulent subscribers and stolen/defective handsets than previously possible.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DESCRIPTION OF A PREFERRED EMBODIMENTS

The embodiments of the present disclosure relate to GSM networks and also to CDMA/TDMA networks. The method and apparatus of the present disclosure initiate optional authentication, TMSI reallocation, and EIR query of subscribers in GSM and CDMA/TDMA, based on user-definable and system capacity parameters, including time based parameters, as discussed further herein below.

Figure 1:
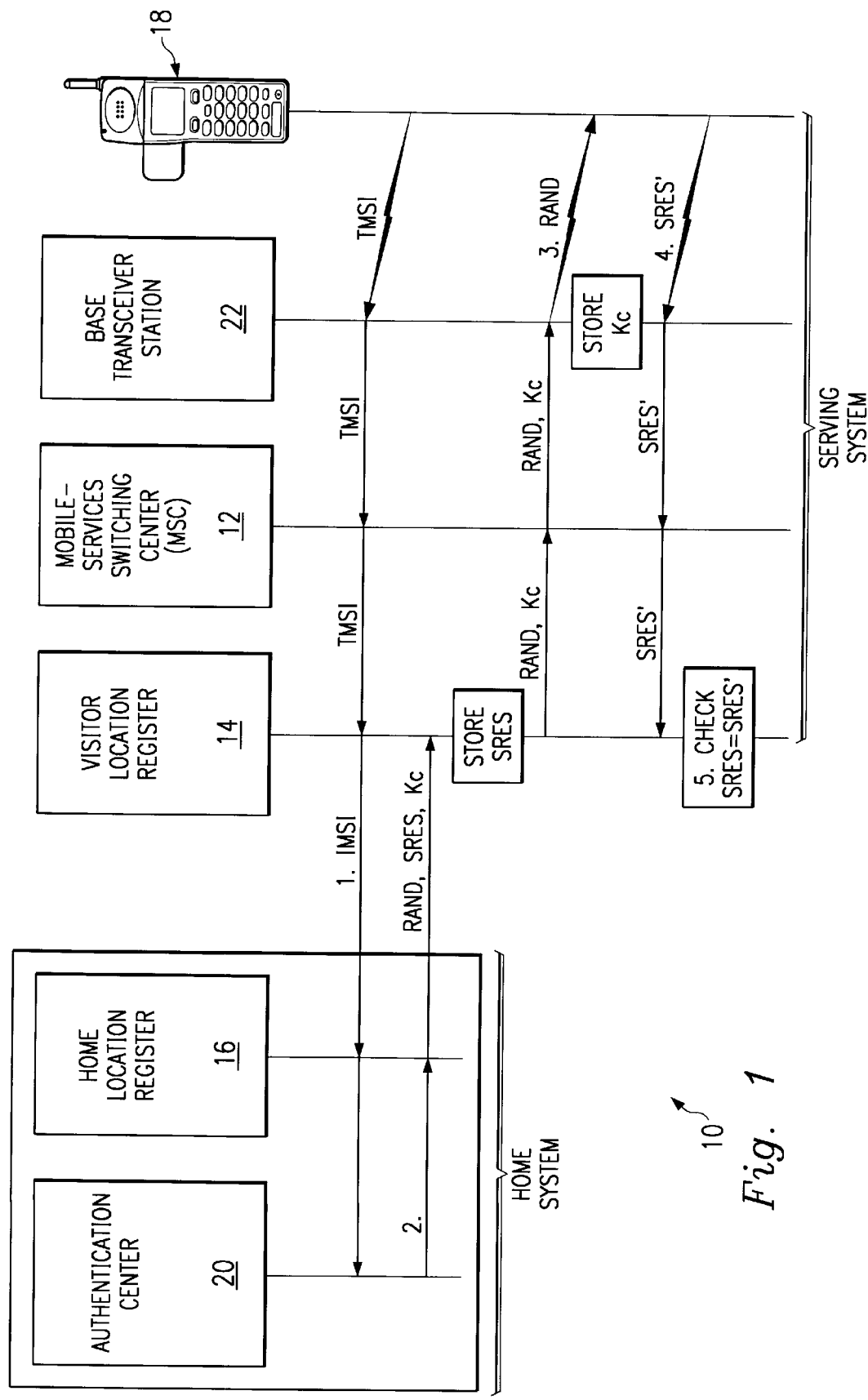
FIG. 1 illustrates a process for authentication of a mobile station in a wireless communication system.
Figure 2:
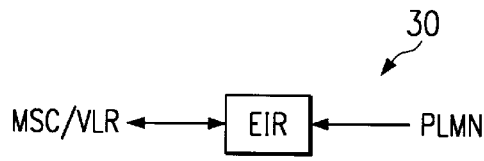
FIG. 2 illustrates an EIR database for use with security measures of a wireless communication system.
Figure 3:
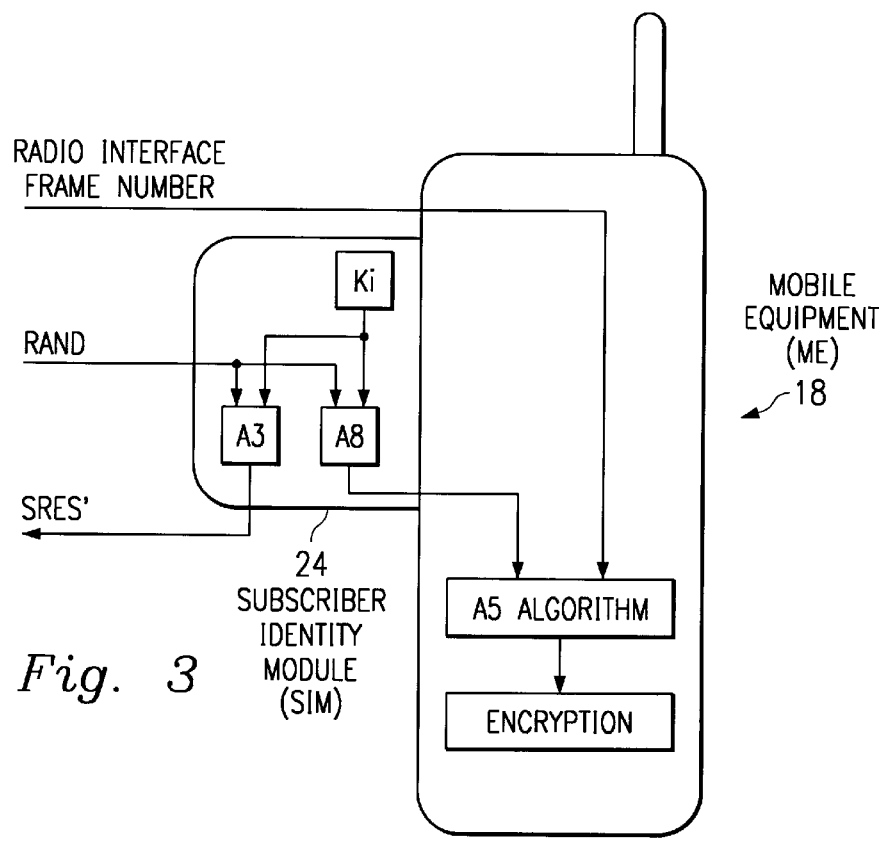
FIG. 3 is an illustration of a mobile equipment and authentication's role in ciphering in conjunction with the mobile equipment.
Figure 4:
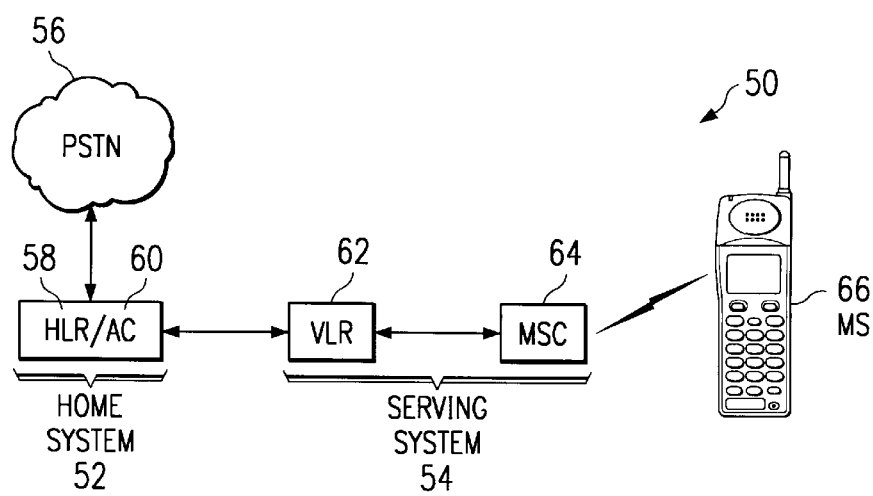
FIG. 4 illustrates a wireless communications system for implementation of the variable rate optional security measures according to the embodiments of the present disclosure.

Referring now to FIG. 4, a wireless communications system 50 includes a home system 52 and a serving system 54. While only one servicing system or node 54 is illustrated in FIG. 4, it should be noted that communications system 50 may further include multiple serving systems or nodes (not shown). The home system 52 provides the necessary communication switching for coupling with a public switched telephone network PSTN 56. Home system 52 includes an home location register 58 and authentication center 60. Serving system 54 includes a visitor location register VLR 62 and a mobile switching center MSC 64. The mobile equipment 66 is coupled to the wireless communications system 50 via MSC 64.

Figure 5:
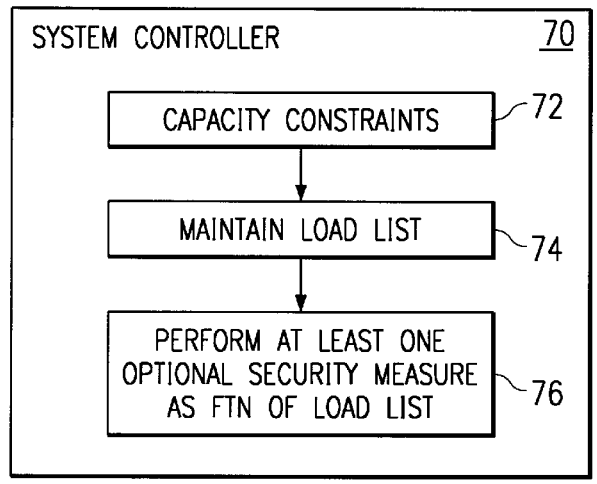
FIG. 5 illustrates apparatus for carrying out the method of the present disclosure.

With reference now to FIGS. 4 and 5, according to one embodiment, home system 54 includes a mobile communications switching apparatus 70 for interaction with a plurality of nodes (54) in a communication network 50. Mobile communications switching apparatus 70, having variable rate optional security measures, includes a means 72 for determining a capacity constraint of at least one node of the network 50; means 74 for dynamically maintaining a load list for each node 54 as a function of the capacity constraint, the load list indicating any overload states of the nodes (54); and means 76 for selectively performing at least one optional security measure on the network as a function of the load list, wherein the at least one optional security measure is selected from a plurality of optional security procedures.

The wireless telecommunications system 50 includes identifying a time and rate of optional security measures to apply or to be applied, for example, as established by a system operator. In another embodiment, the telecommunications system 50 includes suitable means for estimating an amount of excess capacity of the system at any given time. That is, a capacity estimation function is provided to determine how much excess capacity on the system is available at any particular time. By identifying when excess capacity is available on the network, the excess capacity identification advantageously enables the system implementation of prescribed optional procedures to increase network security. In the present disclosure, any procedures beyond the mandatory GSM recommendations are referred to herein as optional procedures.

According to the method and apparatus of the present disclosure, one does not merely apply all optional security measures beyond the mandatory GSM recommendations. Rather, according to the present method and apparatus, the security measures are applied at a prescribed reduced rate, as further discussed herein. For instance, with a one in N authentication (1 in N, where N is an integer), an optional authentication is applied to one out of every N transactions. In one embodiment, N is on the order of about twenty (20). In addition, one in M (where M is an integer) EIR Query/ IMEI Check on revenue generating transactions or calls/ SMS are applied. For example, an EIR Query/IMEI Check can be applied on a first (1st) call/SMS after attach. TMSI reallocation is also preferably applied only when mandated. Other security measures are further possible, for example, to include location based security measures, per-subscriber security measures, etc. Per-subscriber measures may include prescribed measures applied to accounts having a higher susceptibility to fraud, for instance, new subscriber accounts or accounts in which a subscriber travels extensively, thus being susceptible to a higher incidence of fraud.

In accordance with the embodiments of the present disclosure, suitable means are provided to identify when excess capacity of a wireless communications system is available. In response to an identification of when excess capacity is available, the excess capacity is used for implementing optional procedures or security measures to advantageously increase network security. For example, optional authentication is applied at 1 in N. In addition, EIR Query/ IMEI check and TMSI reallocation are done to save capacity but for only one time during the life of the system, i.e., to move the engineering limit of the system to a higher point. For all other times, the excess capacity can be used to provide additional security. It is noted that even when the wireless communications system reaches capacity exhaust, the time at which the system is exhausted is not all the time, i.e., only at prescribed busy times is the system exhausted.

Figure 6:
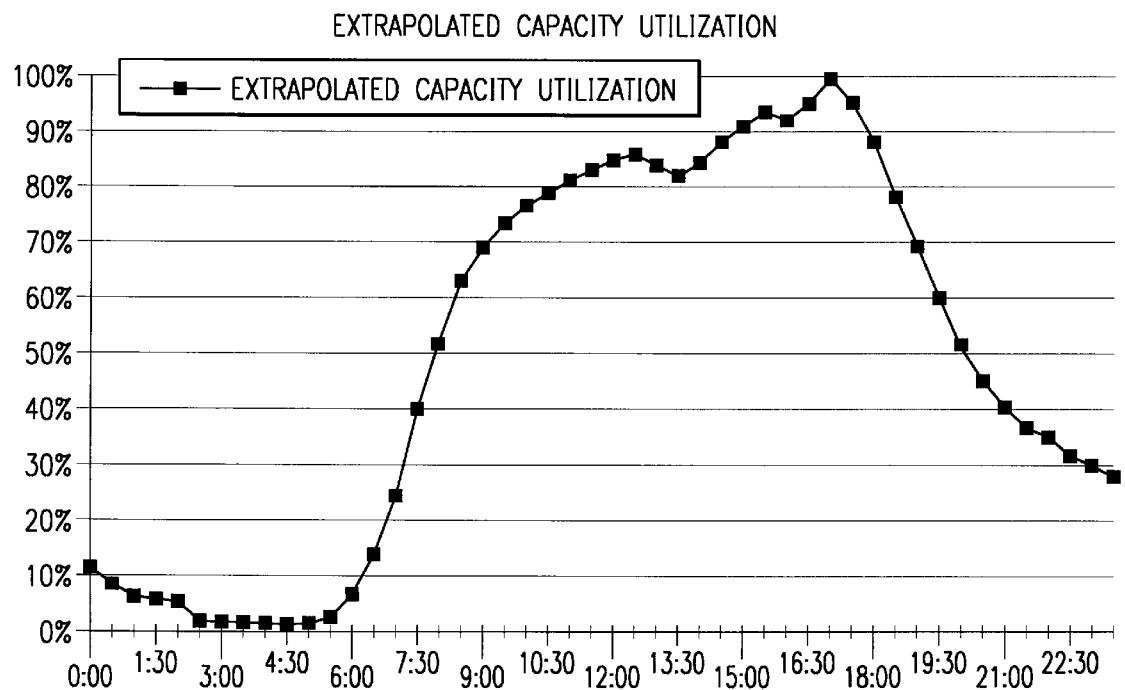
FIG. 6 is a graphical representation of a capacity utilization of the wireless communications network of FIG. 4 over a twenty-four hour period.
Figure 7:
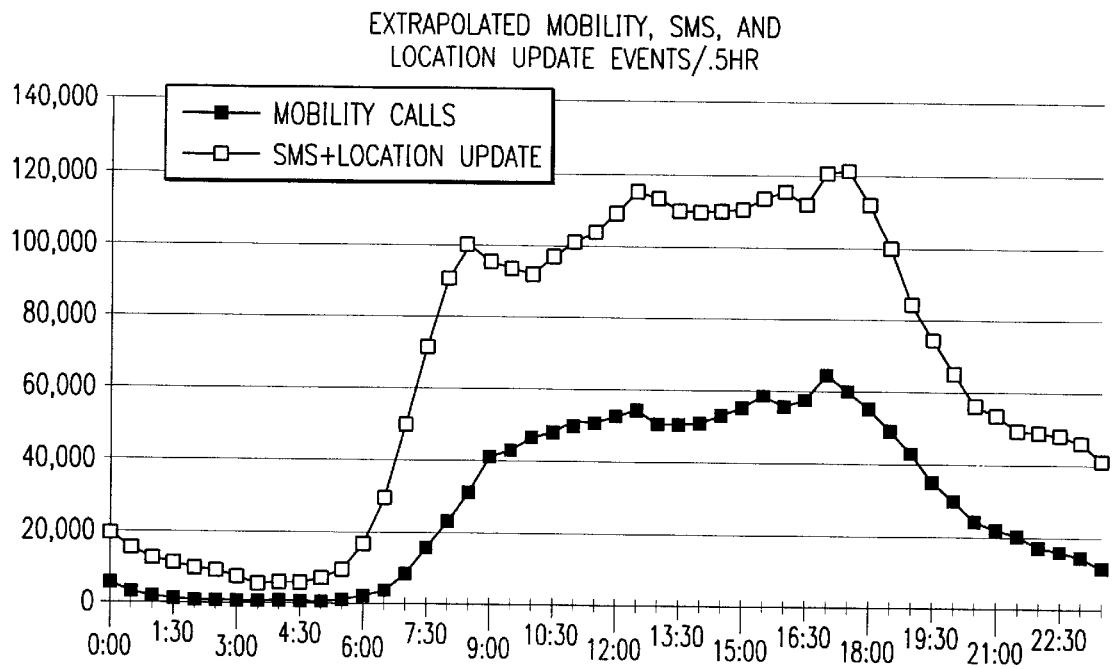
FIG. 7 is a graphical representation of mobility, SMS (Short Message Service), and location update events of the wireless communications network of FIG. 4 over a twenty-four hour period.

To further illustrate the embodiments of the present disclosure, a capacity utilization of a given wireless communications system has been extrapolated for a twenty four hour period, such as shown in the graph of extrapolated capacity utilization of FIG. 6. In the capacity utilization extrapolation, 1.693 million (out of 4.629 million) transactions are processed when the utilization is less than seventy-five percent (75%). In such an instance, full security measures (i.e., the mandatory GSM recommendations and optional security measures) can be applied. Referring still to FIG. 6, 3.920 million transactions are processed when the utilization is less than ninety-four percent (94%). In the latter instance, security measures of 1 in 1 authentication could be applied. Furthermore, as a result of the variable rate optional security measures of the present disclosure, eighty-four percent (84%) of all transactions are authenticated versus a current authentication of five percent (5%), if the busy times can be avoided (on the order of two (2) hours per 24 hour period). In addition to the extrapolated capacity utilization of FIG. 6, a measure of extrapolated mobility, SMS, and location update events (on the order of every half-hour) for a corresponding 24 hour period is illustrated in FIG. 7.

Further in accordance with yet another embodiment of the present disclosure, time of day/day of week security measures are employed. That is, the present method and apparatus apply optional security procedures at differing rates based on time of day/day of week. This embodiment requires knowledge of all capacity constraints in the network. In addition, the embodiment requires engineering to particular traffic profiles and capacity constraints. For example, the security procedures may include: 1 in 1 Authentication, TMSI Reallocation, and EIR Query/Check IMEI during the time period of 8 p.m. to 10 a.m., Monday–Friday; 1 in 3 Authentication, No TMSI Reallocation, and 1 in 10 EIR Query/Check IMEI during the time period of 10 a.m. to 3 p.m., Monday–Friday; 1 in 20 Authentication, No TMSI Reallocation, and 1 in 20 EIR Query/Check IMEI during the time period of 3 p.m. to 6 p.m., Monday–Friday; and apply all measures twenty-four (24) hours a day on Saturday and Sunday. The method and apparatus described is simple and predictable; however is subject to a certain amount of risk due to traffic shift or behavior change. Traffic shift or behavior change may occur with the occurrence of a football game, catastrophe, network incident, or due to the holidays. Absent any unexpected traffic shift or behavior change, however, an overall improved security is still obtained.

Figure 8:
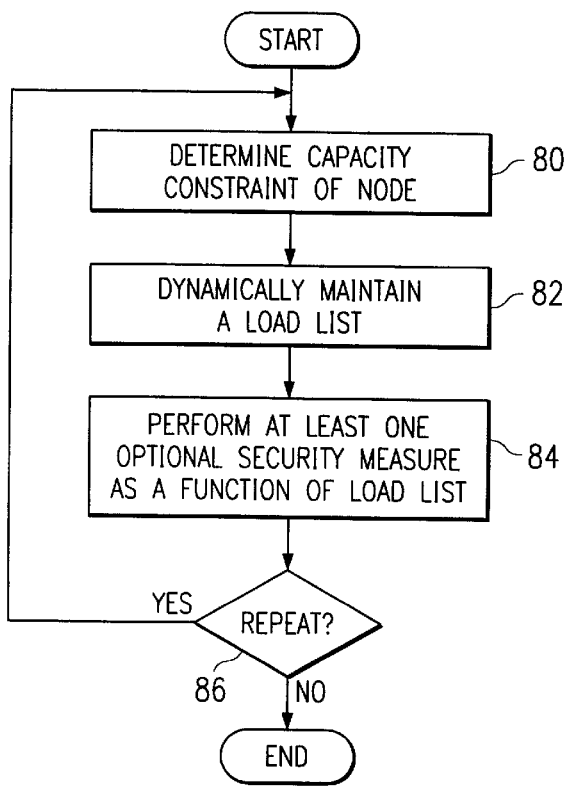
FIG. 8 is a flow diagram of the method of providing variable rate optional security measures according to the embodiments of the present disclosure.

With reference now to FIG. 8, according to one embodiment of the present disclosure, a method for variable rate optional security measures in a communications network, the communications network having a plurality of nodes for communication with mobile subscribers, includes the steps of determining a capacity constraint of at least one node of the network (Step 80). A load list is dynamically maintained for each node as a function of the capacity constraint (Step 82). The load list is for indicating any overload states of the respective nodes. Lastly, at least one optional security measure is selectively performed on the network as a function of the load list (Step 84), wherein the at least one optional security measure is selected from a plurality of optional security procedures. In Step 86, an inquiry is carried out as to whether or not to continue with the variable rate optional security measures. If yes, then proceed again at step 80, otherwise end.

In addition to the above, each of the plurality of optional security procedures can be selectively performed at a frequency rate in accordance with an overload state of a respective node. In this later instance, the method further includes the step of individually controlling the frequency rate for each of the plurality of optional security procedures.

Still further, the frequency rate for at least one optional security procedure is different than the frequency rate for another optional security procedure.

Furthermore, in conjunction with the above method, the plurality of optional security procedures may include authentication, TMSI reallocation, and EIR Query/Check IMEI. In addition, the capacity constraint for a node can be determined as a function of a time of day. Still further, the load list can include a listing which is a function of an estimation of node capacity constraint, wherein the estimation can be maintained in real-time.

In yet another embodiment, the method and apparatus dynamically estimate available capacity for implementing optional security measures. With a dynamic capacity estimation, the following steps are performed. To begin, the present method determines capacity constraints for nodes of the network. These capacity constraints include link, processor, and network factors (e.g., HLR/AUC, BSC/BTS/ Link, MSC/VLR, EIR). Next, load factors are developed for each optional procedure and for each constraining factor and basic transactions. A load list is maintained as transactions are processed, as well as the overload states of nodes, if available, for a particular node. When an optional procedure could be invoked, a check is made for available capacity (over a few seconds), and the optional procedure applied at an appropriate rate and priority (perhaps user-specified), and debit for each node—for example, using a simple rate-based debit/credit system. In addition, dynamic estimation can be applied during off-hours (i.e., non-peak hours) includes a combination of determining capacity constraints for nodes of the network and developing load factors for each optional procedure for each constraining factor and basic transactions.

The embodiments of the present disclosure further include a mobile or wireless communications switching apparatus 70 (FIG. 5) for interaction with a plurality of nodes in a communication network and having variable rate optional security measures. The switching apparatus includes a first means for determining a capacity constraint of at least one node of the network, wherein the capacity constraint can be determined using any suitable node usage capacity monitor. The switching apparatus further includes a means for dynamically maintaining a load list for each node as a function of the capacity constraint. The load list is for indicating any overload states of one or more nodes of the wireless communications system. Maintaining of the load list for a node as a function of capacity constraint may be carried out using any suitable computer or controller having been programmed with suitable program code for carrying out the function as described. Lastly, a means is provided for selectively performing at least one optional security measure on the network as a function of the load list. Such a means may include a computer or controller having been programmed with suitable program code for carrying out the function as described. The at least one optional security measure is selected from a plurality of optional security procedures, wherein each of the plurality of optional security procedures is selectively performed at a frequency rate in accordance with an overload state of a respective node.

Further in conjunction with the switching apparatus discussed above, the apparatus can further include means for individually controlling the frequency rate for each of the plurality of optional security procedures. In one embodiment, the frequency rate for at least one optional security procedure is different than the frequency rate for another optional security procedure. The plurality of optional security procedures include authentication, TMSI reallocation, and EIR Query/Check IMEI. In addition, the capacity constraint for a node can be determined as a function of a time of day. Furthermore, the load list is a function of an estimation of node capacity constraints, wherein the estimation is maintained in real-time.

A mobile communications switching apparatus for interaction with a plurality of nodes in a communication network and having variable rate optional security measures includes a capacity constraint determination circuit, a load list maintenance circuit, and a security measure performance circuit. The capacity constraint determination circuit includes a suitable circuit for determining a capacity constraint of at least one node of the network. The load list maintenance circuit is a suitable circuit for dynamically maintaining a load list for each node as a function of the capacity constraint, the load list indicating any overload states of the nodes. Lastly, the security measure performance circuit is a suitable circuit for selectively performing at least one optional security measure on the network as a function of the load list, wherein the at least one optional security measure is selected from a plurality of optional security procedures. In addition, the mobile communications switching apparatus includes a frequency control circuit for individually controlling the frequency rate for each of the plurality of optional security procedures. In this later instance, each of the plurality of optional security procedures is selectively performed at a frequency rate in accordance with an overload state of a respective node. Furthermore, the frequency rate for at least one optional security procedure is different than the frequency rate for another optional security procedure. Still further, the plurality of optional security procedures include authentication, TMSI reallocation, and EIR Query/ Check IMEI. In the later embodiment, the load list is a function of an estimation of the node capacity constraints, wherein the estimation is maintained in real-time.

Products where the method and apparatus of the present disclosure could be applied include GSM-MSC based products, as well as MTX-TDMA (Mobile Telephone Exchange-Time Division Multiple Access) and MTX-CDMA (Mobile Telephone Exchange-Code Division Multiple Access) products. In addition, the method and apparatus are extendable to any optional security procedure applied in a wireless communications network.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for variable rate optional security measures in a communications network, the communications network having a plurality of nodes for communication with mobile subscribers, said method comprising the steps of:

determining a capacity constraint of at least one node of the network;

dynamically maintaining a load list for each node as a function of the capacity constraint, the load list indicating any overload states of the nodes; and selectively performing at least one optional security measure on the network as a function of the load list, wherein the at least one optional security measure is selected from a plurality of optional security procedures.

2. The method of claim 1, wherein each of the plurality of optional security procedures is selectively performed at a frequency rate in accordance with an overload state of a respective node.

3. The method of claim 1, wherein the plurality of optional security procedures include authentication, TMSI reallocation, and EIR Query/Check IMEI.

4. The method of claim 1, wherein the capacity constraint for a node is determined as a function of a time of day.

5. The method of claim 1, wherein the load list is a function of an estimation of node capacity constraints.

6. The method of claim 1, further comprising the step of:

individually controlling the frequency rate for each of the plurality of optional security procedures, and wherein each of the plurality of optional security procedures is selectively performed at a frequency rate in accordance with an overload state of a respective node, further wherein the frequency rate for at least one optional security procedure is different than the frequency rate for another optional security procedure, further wherein the plurality of optional security procedures include authentication, TMSI reallocation, and EIR Query/Check IMEI.

7. The method of claim 2, further comprising the step of:

individually controlling the frequency rate for each of the plurality of optional security procedures.

8. The method of claim 5, wherein the estimation is maintained in real-time.

9. The method of claim 6, still further wherein the load list is a function of an estimation of node capacity constraints, and wherein the estimation is maintained in real-time.

10. The method of claim 7, wherein the frequency rate for at least one optional security procedure is different than the frequency rate for another optional security procedure.

11. A mobile communications switching apparatus for interaction with a plurality of nodes in a communication network and having variable rate optional security measures, said switching apparatus comprising:

means for determining a capacity constraint of at least one node of the network;

means for dynamically maintaining a load list for each node as a function of the capacity constraint, the load list indicating any overload states of the nodes; and means for selectively performing at least one optional security measure on the network as a function of the load list, wherein the at least one optional security measure is selected from a plurality of optional security procedures.

12. The apparatus of claim 11, wherein each of the plurality of optional security procedures is selectively performed at a frequency rate in accordance with an overload state of a respective node.

13. The apparatus of claim 11, wherein the plurality of optional security procedures include authentication, TMSI reallocation, and EIR Query/Check IMEI.

14. The apparatus of claim 11, wherein the capacity constraint for a node is determined as a function of a time of day.

15. The apparatus of claim 11, wherein the load list is a function of an estimation of node capacity constraints.

16. The apparatus of claim 11, further comprising:

means for individually controlling the frequency rate for each of the plurality of optional security procedures, and wherein each of the plurality of optional security procedures is selectively performed at a frequency rate in accordance with an overload state of a respective node, further wherein the frequency rate for at least one optional security procedure is different than the frequency rate for another optional security procedure, further wherein the plurality of optional security procedures include authentication, TMSI reallocation, and EIR Query/Check IMEI.

17. The apparatus of claim 12, further comprising:

means for individually controlling the frequency rate for each of the plurality of optional security procedures.

18. The apparatus of claim 15, wherein the estimation is maintained in real-time.

19. The apparatus of claim 16, still further wherein the load list is a function of an estimation of node capacity constraints, and wherein the estimation is maintained in real-time.

20. The apparatus of claim 17, wherein the frequency rate for at least one optional security procedure is different than the frequency rate for another optional security procedure.

21. A mobile communications switching apparatus for interaction with a plurality of nodes in a communication network and having variable rate optional security measures, said switching apparatus comprising:

capacity constraint determination circuit for determining a capacity constraint of at least one node of the network;

load list maintenance circuit for dynamically maintaining a load list for each node as a function of the capacity constraint, the load list indicating any overload states of the nodes; and security measure performance circuit for selectively performing at least one optional security measure on the network as a function of the load list, wherein the at least one optional security measure is selected from a plurality of optional security procedures.

22. The apparatus of claim 21, further comprising:

frequency control circuit for individually controlling the frequency rate for each of the plurality of optional security procedures, and wherein each of the plurality of optional security procedures is selectively performed at a frequency rate in accordance with an overload state of a respective node, further wherein the frequency rate for at least one optional security procedure is different than the frequency rate for another optional security procedure, further wherein the plurality of optional security procedures include authentication, TMSI reallocation, and EIR Query/Check IMEI.

23. The apparatus of claim 22, still further wherein the load list is a function of an estimation of the node capacity constraints, and wherein the estimation is maintained in real-time.

* * * * *